(12) United States Patent
Yao

(10) Patent No.: US 8,445,602 B2
(45) Date of Patent: May 21, 2013

(54) POLY LACTIC ACID RESIN, RESIN COMPOSITION, AND RESIN MOLDING

(75) Inventor: Kenji Yao, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 12/941,480

(22) Filed: Nov. 8, 2010

(65) Prior Publication Data

US 2011/0319553 A1 Dec. 29, 2011

(30) Foreign Application Priority Data

Jun. 28, 2010 (JP) ................................. 2010-146758

(51) Int. Cl.
*C08G 63/91* (2006.01)
(52) U.S. Cl.
USPC ............ 525/415; 525/410; 525/411; 525/450

(58) Field of Classification Search
USPC .................. 525/410, 411, 415, 450
See application file for complete search history.

(56) References Cited

U.S. PATENT DOCUMENTS

| 5,302,694 | A | * | 4/1994 | Buchholz | ...................... 528/354 |
| 6,365,173 | B1 | * | 4/2002 | Domb et al. | .................. 424/426 |
| 2008/0039579 | A1 | | 2/2008 | Kimura et al. | |

FOREIGN PATENT DOCUMENTS

| JP | 2004-190026 | * | 7/2004 |
| JP | A-2006-70102 | | 3/2006 |

* cited by examiner

*Primary Examiner* — Robert Jones, Jr.
(74) *Attorney, Agent, or Firm* — Oliff & Berridge, PLC

(57) ABSTRACT

The present invention provides a poly lactic acid resin including an L-lactic acid block and a D-lactic acid block, which blocks are bonded by a carbonate bonding.

13 Claims, 2 Drawing Sheets

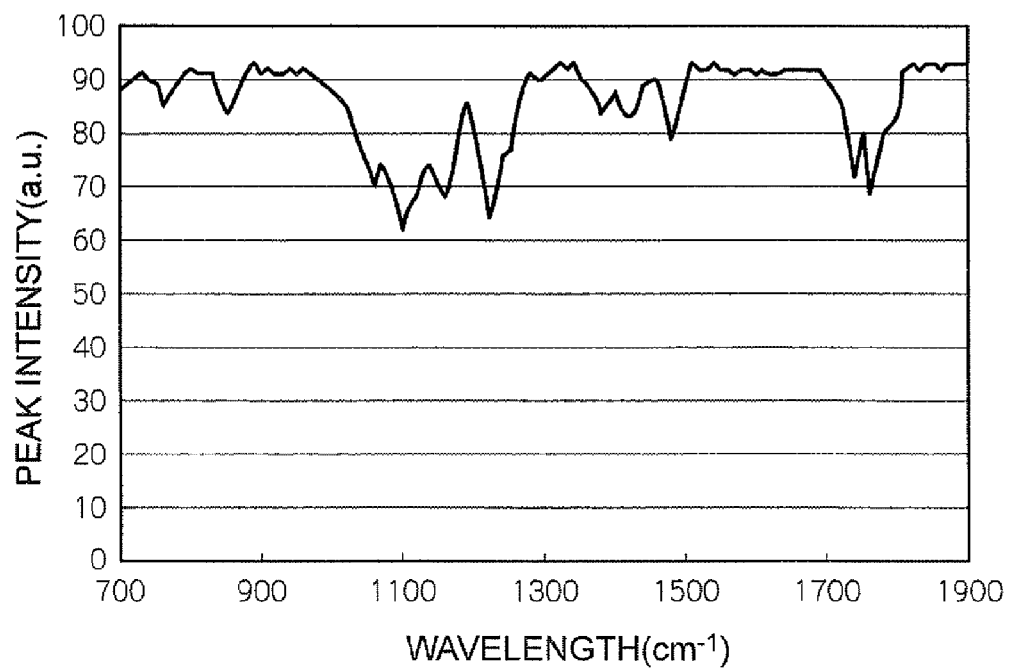
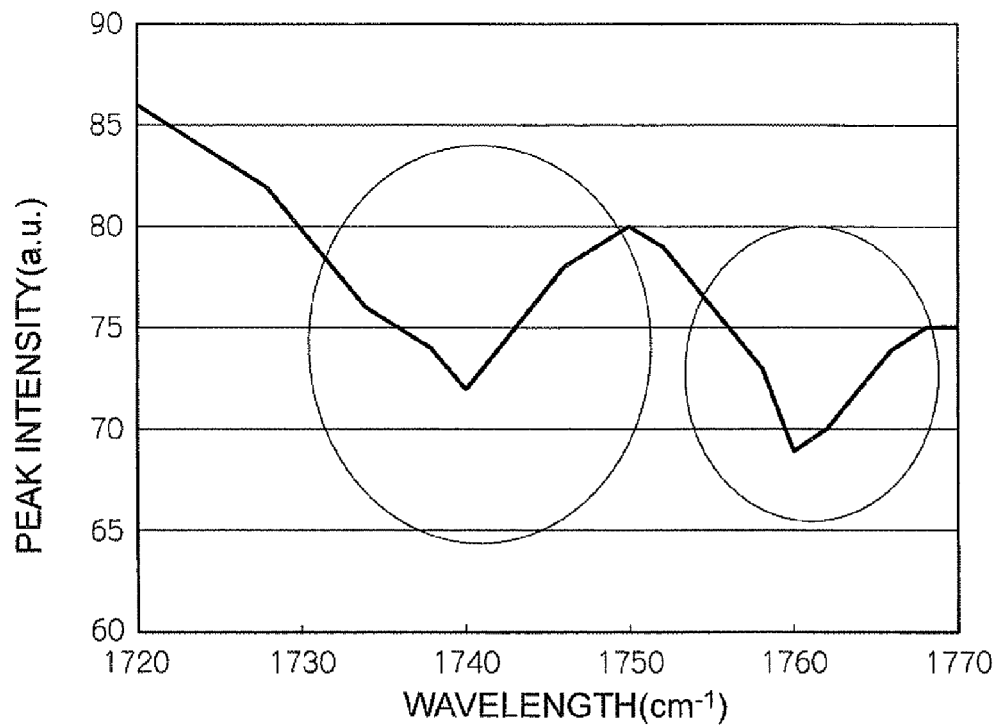

POLY LACTIC ACID RESIN, RESIN COMPOSITION, AND RESIN MOLDING

CROSS-REFERENCE TO RELATED APPLICATION

This application is based on and claims priority under 35 USC 119 from Japanese Patent Application No. 2010-146758 filed on Jun. 28, 2010.

BACKGROUND

1. Technical Field

The present invention relates to a poly lactic acid resin, a resin composition, and a resin molding.

2. Related Art

Various types of resin compositions have been provided and used in various applications so far. Particularly, the compositions are used for various kinds of components, a housing (package), or the like of home electric appliances or cars. In addition, for office machines or electronic and electric instruments, as a component such as a housing (package), thermoplastic resins have been used. Among these, various resin compositions that include a poly lactic acid resin as a constituent resin thereof have been examined.

SUMMARY

According to an aspect of the invention, there is provided a poly lactic acid resin including an L-lactic acid block and a D-lactic acid block, which blocks are bonded by a carbonate bonding.

BRIEF DESCRIPTION OF THE DRAWINGS

Exemplary embodiments of the present invention will be described in detail base on the following figures, wherein:

FIG. 2 is a graph showing an absorption spectrum of a compound obtained in Example A1; and FIG. 3 is a magnification of a part of the graph shown in FIG. 2.

DETAILED DESCRIPTION

Figure 1:
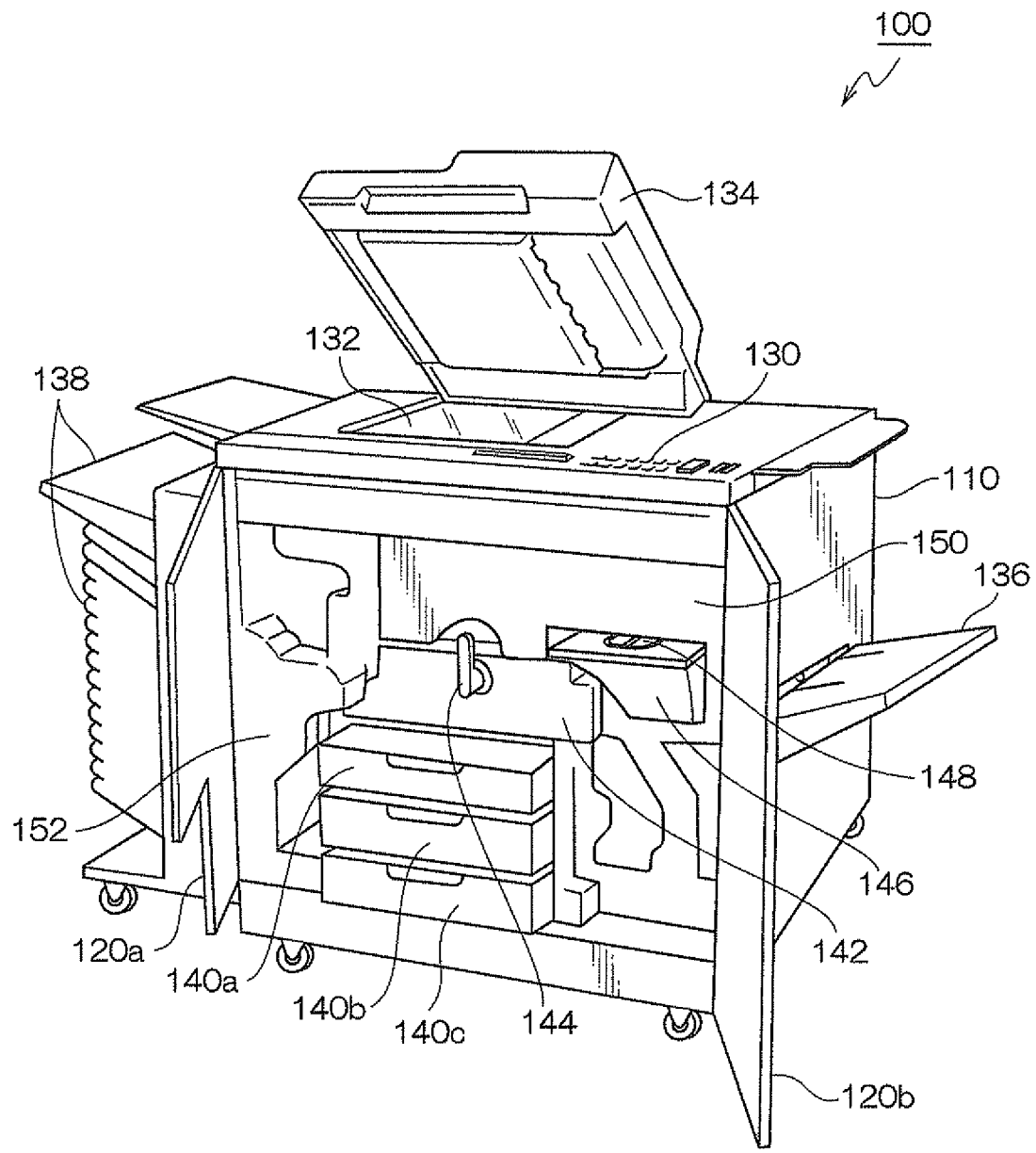
FIG. 1 is a schematic view showing an example of a component of an electronic and electric instrument equipped with a resin molding according to an exemplary embodiment of the present invention.

Exemplary embodiments of a poly lactic acid resin, a resin composition, and a resin molding according to the present invention are described hereinafter.

Poly Lactic Acid Resin

A poly lactic acid resin according to an exemplary embodiment of the present invention includes an L-lactic acid block and a D-lactic acid block, which blocks are bonded by a polycarbonate bonding.

Generally, poly lactic acid exhibits low crystallization rate and also low deflection temperature under load. To address these problems, firstly, regarding the crystallization rate, a method of improving the crystallization rate by addition of a nucleating agent or a nucleation promoter may be a conceivable measurement. However, incorporation of these foreign substances may cause another disadvantage. As a method of not incorporating these foreign substances, a method exists in which a stereo complex obtained by mixing a poly L-lactic acid and a poly D-lactic acid is used. However, when a resin molding is formed by using the stereo complex, the temperature of a mold is required to be set at a high temperature of 80° C. or higher. Further for crystallization, the resin molding is required to be kept in the mold for a period of one minute or longer. Therefore, a resin molding is not easily produced. Secondly, regarding a method of elevating the deflection temperature under load, no method has been known except the method of incorporating the foreign substances.

The poly lactic acid resin according to an exemplary embodiment of the present invention is a poly lactic acid resin that has a structure including both L-lactic acid block and D-lactic acid block in the molecule thereof, as described above. Due to the structure including both blocks, similarly to the stereo complex of poly L-lactic acid and poly D-lactic acid, a packing effect between the poly L-lactic acid block and the poly D-lactic acid block is brought about. In addition, because both block structures exist in the molecule, molecular migration becomes extremely fast. As a result, it is presumed that the crystallization rate is enhanced. Furthermore, the packing probability between the L-lactic acid block and the D-lactic acid block becomes high, so that the deflection temperature under load is presumed to become high.

Structure

The poly lactic acid resin according to the exemplary embodiment is a resin including an L-lactic acid block (poly L-lactic acid unit) represented by the following structural formula (1) and a D-lactic acid block (poly D-lactic acid unit) through a carbonate bonding (—O—C(=O)—O—).

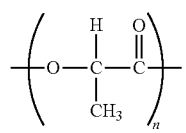

Structural formula (1)

Here, regarding a synthesis method of the above structure, when L-lactic acid and L-lactic acid or D-lactic acid and D-lactic acid are attempted to bond through carbonate, steric hindrance reverses one of the two, so that the structure that includes both L-lactic acid block and D-lactic acid block in the molecular chain thereof is formed.

Polymerization Degree

In the poly lactic acid resin according to the exemplary embodiment, the L-lactic acid block and the D-lactic acid block each have a polymerization degree of preferably 10 or more and more preferably 30 or more. When the polymerization degree is 10 or more, the packing effect between the L-lactic acid block and the D-lactic acid block is obtained in a more definitive manner, whereby the crystallization rate tends to become faster and also the deflection temperature under load tends to become higher.

Molecular Weight

The poly lactic acid resin according to the exemplary embodiment has a weight average molecular weight of preferably from 5,000 to 200,000 and more preferably from 20,000 to 120,000, although not particularly limited. When the weight average molecular weight is 5,000 or more, the deflection temperature under load tends to become higher, and when it is 200,000 or less, the crystallization rate tends to become faster.

Here, measurement of the weight average molecular weight is performed by gel permeation chromatography (GPC). The GPC measurement of molecular weight is carried out using a measurement apparatus: HLC-8320GPC (trade name, manufactured by TOSOH Corporation) with two columns: TSKgel GMHHR-M+TSKgel GMHHR-M (trade name, manufactured by TOSOH Corporation, 7.8 mm I.D.× 30 cm), and a chloroform solvent. The weight average molecular weight is calculated from the result of the measurement by using a molecular weight calibration curve obtained from a mono-dispersed polystyrene standard sample. Hereinafter, the weight average molecular weight is measured in accordance with this method.

Ratio

The average composition ratio (weight ratio) between the L-lactic acid block (L-form) and the D-lactic acid block (D-form) (L-form:D-form) is preferably from 15:85 to 85:15, more preferably from 20:80 to 80:20, and particularly preferably from 40:60 to 60:40.

Here, the average composition ratio (weight ratio) of L-form:D-form is evaluated by using FTIR ("FTIR6300" (trade name), manufactured by JASCO). With respect to a peak that is derived from a carbonyl group and appears at around 1750 $cm^{-1}$, there is a slight shift in the peak between an L-unit and a D-unit. The average composition ratio (weight ratio) of L-form: D-form is determined by the difference in peak intensity between these units.

The ratio (weight ratio) of the carbonate bonding to a total weight of the poly lactic acid resin according to the exemplary embodiment is, although not particularly limited, preferably from 0.5% by weight to 3% by weight and more preferably from 0.7% by weight to 2.5% by weight.

Existence of the carbonate bonding can be confirmed by observation of a peak that is derived from a carbonyl group and appears at around 154 ppm by means of $^{13}$C-NMR (400 MHz, $CDCL_3$) (JNM-AL400, manufactured by JEOL Ltd.).

Crystallization rate of the poly lactic acid resin according to the exemplary embodiment is preferably from 15 sec to 60 sec and more preferably from 20 sec to 55 sec. Measurement of the crystallization rate can be performed in the same manner as in "Evaluation of crystallization rate" described below.

The deflection temperature under load of the poly lactic acid resin according to the exemplary embodiment is preferably from 65° C. to 130° C. and more preferably from 70° C. to 100° C. Measurement of the deflection temperature under load can be performed in the same manner as in "Evaluation of deflection temperature under load" described below.

Synthesis Method

As for the synthesis method of the poly lactic acid resin according to the exemplary embodiment, although it is not particularly limited, for example, poly L-lactic acid and poly L-lactic acid or poly D-lactic acid and poly D-lactic acid are present through a carbonate group, whereby one of the two is revered by undergoing steric hindrance in the course of synthesis, as a result, the poly lactic acid resin that incorporates both L-lactic acid block and D-lactic acid block in the molecular chain thereof is formed.

Here, one example of the above synthesis method is described in detail. For example, in a three-necked flask, poly L-lactic acid (or poly D-lactic acid) and a compound having a carbonate group are mixed in a ratio in accordance with a desired ratio of respective structural lengths between L-lactic acid block and D-lactic acid block. After an appropriate amount of an ester-exchange catalyst is added, the three-necked flask is subjected to vacuum suction and agitated at a temperature (for example, from 100° C. to 180° C.) where ester-exchange reaction is allowed to proceed. The reaction is allowed to proceed while an ester-exchange distillate (for example, phenol in a case in which diphenyl carbonate is used as the compound having a carbonate group) is removed from the reaction system, so that the poly lactic acid resin according to the exemplary embodiment is obtained.

Here, examples of the compound having a carbonate group include diphenyl carbonate; methylphenyl carbonate; ethylphenyl carbonate; n-propylphenyl carbonate; isopropylphenyl carbonate; and dimethyl carbonate. Among these, a compound that has a symmetric structure with respect to the carbonate group is more preferable, and diphenyl carbonate is particularly preferable.

Examples of the ester-exchange catalyst include tetrabutoxy titanate; calcium acetate; magnesium acetate; and cobalt acetate. Among these, tetrabutoxy titanate is particularly preferable from the viewpoint of reactivity.

Resin Composition

A resin composition according to an exemplary embodiment of the present invention is characterized by incorporating therein the poly lactic acid resin according to the exemplary embodiment. The content of the poly lactic acid resin is preferably 10% by weight or more with respect to a total composition and more preferably 30% by weight or more. When the content of the poly lactic acid is 10% by weight or more, the crystallization rate becomes higher and the deflection temperature under load tends to become higher.

In addition to the poly lactic acid resin, the resin composition according to the exemplary embodiment may include (a) a resin other than the poly lactic acid, (b) a compound (flame retardant) that has flame retardancy, and (c) the other components.

(a) Resin

As the resin that is used for the resin composition according to the exemplary embodiment, the poly lactic acid resin according to the exemplary embodiment may be solely used, or the other additional resins may be used in combination. Examples of the resins that may be used in combination include a thermoplastic resin.

Thermoplastic Resin

As the thermoplastic resin, conventionally known resins are used. Specifically, examples of the resins include an aliphatic polyester resin; an aromatic polyester resin; a polycarbonate resin; a polyamide resin; a polypropylene resin; a polyimide resin; a poly lactic acid resin; a polyolefin resin; a polyester carbonate resin; a polyphenylene ether resin; a polyphenylene sulfide resin; a polysulfone resin; a polyether sulfone resin; a polyarylene resin; a polyether imide resin; a polyacetal resin; a polyvinyl acetal resin; a polyketone resin; a polyether ketone resin; a polyetherether ketone resin; a polyaryl ketone resin; a polyether nitrile resin; a liquid crystal resin; a polybenzimidazole resin; a polyparaben resin; a vinyl polymer or copolymer resin that is obtained by polymerizing or copolymerizing at least one kind of vinyl monomers selected from a group consisting of an aromatic alkenyl compound, a methacrylic acid ester, an acrylic acid ester, and a cyanated vinyl compound; a copolymer resin of a diene and an aromatic alkenyl compound; a copolymer resin of a cyanated vinyl, a diene, and an aromatic alkenyl compound; a copolymer resin of an aromatic alkenyl compound, a diene, a cyanated vinyl, and an N-phenylmaleimide; a copolymer resin of a cyanated vinyl, an (ethylene-diene-propylene (EPDM)), and an aromatic alkenyl compound; polyolefin; vinyl chloride resin; and a chlorinated vinyl chloride resin.

Among these, the polycarbonate resin may be a polymer alloy in which at least one kind of polycarbonate resins and at least one kind of styrene resins are combined together.

Among the above thermoplastic resins, a biodegradable resin is preferably used. Any of biodegradable resins may be used as the biodegradable resin. Examples of the resin to be used includes poly lactic acid; polybutylene saccinate; polyhydroxy butyrate; polycaprolactone; poly(butylene saccinate/adipate); poly(butylene saccinate/carbonate); polyethylene saccinate; polyvinylalcohol; cellulose acetate; a starch-modified resin; and a cellulose-modified resin.

In the resin composition according to the exemplary embodiment, a total content of resins including the poly lactic acid resin according to the exemplary embodiment is preferably from 20% by weight to 95% by weight with respect to a total weight of the resin composition.

(b) Compound Having Flame Retardancy (Flame Retardant)

The resin composition according to the exemplary embodiment may further include a compound (flame retardant) that has flame retardancy.

The "compound that has flame retardancy" refers to a compound that exhibits no flame retardancy by itself, but exhibits a flame retardancy of HB or higher as defined by UL-94 when the compound is added to a resin composition that has a flame retardancy of lower than HB as defined by UL-94.

In the resin composition according to the present exemplary embodiment, a markedly higher effect in flame retardancy is achieved by combining together the above-described poly lactic acid resin according to the present exemplary embodiment and a flame retardant as compared with a combination of another kind of poly lactic acid and a flame retardant. The reason why such an advantage as described above is obtained presumably results from an extremely close molecular packing characteristic that the poly lactic acid according to the exemplary embodiment possesses, whereby sagging (dripping) caused by heating is suppressed.

As the flame retardant, for example, a flame retardant including a phosphorus-based flame retardant, a silicone-based flame retardant, a nitrogen-containing flame retardant, a sulfuric acid-based flame retardant, and an inorganic hydroxide-based flame retardant may be used.

Examples of the phosphorus-based flame retardant include a condensed phosphoric acid ester; melamine phosphate; ammonium phosphate; and aluminum phosphate. Examples of the silicone-based flame retardant include: dimethyl siloxane; nano silica; and silicone-modified polycarbonate. Examples of the nitrogen-containing flame retardant include a melamine compound and a triazine compound. Examples of the sulfuric acid-based flame retardant include melamine sulfate and guanidine sulfate. Examples of the inorganic hydroxide-based flame retardant include magnesium hydroxide and aluminum hydroxide. Among these, the phosphorous-based flame retardant is more preferable.

The flame retardant may be a synthesized one or a commercially available one.

Examples of the commercially available phosphorus-based flame retardant include PX-200 and PX-202 (trade names) manufactured by Daihachi Chemical Industry Co., Ltd.; TERRAJU C80 (trade name) manufactured by Chemishe Fabrik Budenheim KG; and EXOLIT AP422 and EXOLIT OP930 (trade names) manufactured by Clariant Corporation. Examples of the commercially available silicone-based flame retardant include Z6018 and DC4-7081 (trade names) manufactured by Dow Corning Toray Silicone Co., Ltd. Examples of the commercially available nitrogen-containing flame retardant include FP2200 (trade name) manufactured by ADEKA Corp. Examples of the commercially available sulfuric acid based flame retardant include APINON-901 (trade name) manufactured by Sanwa Chemical Co., Ltd.; MELAMINE PYROPHOSPHATE (trade name) manufactured by Shimonoseki Mitsui Chemicals, Inc.; and FP2100 (trade name) manufactured by ADEKA Corp. Examples of the commercially available inorganic hydroxide-based flame retardant include ECOMAG PZ-1 (trade name) manufactured by Tateho Chemical Industries Co., Ltd.; MGZ3 and MGZ300 (trade names) manufactured by Sakai Chemical Industry Co., Ltd.; and B103ST (trade name) manufactured by Nippon Light Metal Company, Ltd.

In a case in which the flame retardant is added to the resin composition according to the exemplary embodiment, the content thereof is preferably from 5% by weight to 30% by weight with respect to the total weight of the resin composition, and more preferably from 10% by weight to 20% by weight.

(c) Other Components

The resin composition according to the exemplary embodiment may further include the other components. The content of the other components in the resin composition is desirably from 0 (zero) % by weight to 10% by weight and more desirably from 0 (zero) % by weight to 5% by weight. Here, "0 (zero) % by weight" refers to a case in which any of the other components are not included.

Examples of the other components include an antioxidant; a light stabilizer; a weathering stabilizer; a colorant; a mold release agent; a compatibilizer; a plasticizer; a pigment; a modifier; a drip preventing agent; an antistatic agent; a hydrolysis preventing agent; a filler; and a reinforcing agent (including glass fibers, carbon fibers, talc, clay, mica, glass flakes, milled glass, glass beads, crystalline silica, alumina, silicon nitride, aluminum nitride, and boron nitride).

A crystallization rate of the resin composition according to the exemplary embodiment is preferably from 15 sec to 60 sec and more preferably from 20 sec to 55 sec. Measurement of the crystallization rate can be performed in the same manner as in "Evaluation of crystallization rate" described below.

The deflection temperature under load of the resin composition according to the exemplary embodiment is preferably from 65° C. to 130° C. and more preferably from 70° C. to 100° C. Measurement of the deflection temperature under load can be performed in the same manner as in "Evaluation of deflection temperature under load" described below.

Method of Producing Resin Compositions

The resin composition according to the exemplary embodiment is produced according to a melt-kneading process in which at least the poly lactic acid resin according to the exemplary embodiment is used. Additionally, (a) the resin other than the poly lactic acid resin, (b) the flame retardant, and (e) the other components may be added.

For molten-kneading, a conventionally known apparatus may be used. Examples of the apparatus include a bi-axial extruder; a Henschel mixer; a Bunbury mixer; a uni-axial screw extruder; a multi-axial screw extruder; and a Co-Kneader.

Resin Molding

A resin molding according to an exemplary embodiment of the present invention is obtained by molding the resin composition according to the exemplary embodiment. For example, the resin composition according to the exemplary embodiment is molded by using a molding method such as injection molding, extruding molding, blow molding, hot press molding, calendar molding, coating molding, cast molding, dipping molding, vacuum molding, or transfer molding, whereby the resin molding according to the exemplary embodiment is obtained.

The injection molding may be performed using a commercially available apparatus such as NEX150 (trade name) manufactured by Nissei Plastic Industrial Co., Ltd., NEX70000 (trade name) manufactured by Nissei Plastic Industrial Co., Ltd., or SE50D (trade name) manufactured by Toshiba Machine Co., Ltd.

On this occasion, the cylinder temperature of from 170° C. to 280° C. is desirably selected and a cylinder temperature of from 180° C. to 270° C. is more desirably selected. In addition, the mold temperature of from 40° C. to 110° C. is desirably selected and the mold temperature of from 50° C. to 110° C. is more desirably selected.

The resin molding according to the exemplary embodiment is favorably used for applications including electronic and electric instruments; home electric appliances; containers; and an interior material for cars. More specifically, examples of the applications include housing (packages) or various kinds of components for home electric appliances or electronic and electric instruments; wrapping films; holders for CD-ROM or DVD discs; tableware; food trays; beverage bottles; and a wrapping material for chemicals. Among these, the components for electronics and electric instruments are a favorable application.

FIG. 1 is a diagrammatic perspective view of the external appearance, as seen from the front, of an image forming apparatus, which is an example of components of electronic and electrical instruments equipped with a resin molding of the present exemplary embodiment.

An image forming apparatus 100 shown in FIG. 1 is equipped with front covers 120a and 120b at the front of a main body device 110 in the apparatus. These front covers 120a and 120b are configured to be freely opened and closed so that an operator can access the interior of the apparatus. Thus, the operator can refill toner when toner exhaustion occurs, can replace an exhausted process cartridge, and can remove a jammed sheet when jamming occurs in the apparatus. FIG. 1 shows the apparatus in a state in which the front covers 120a and 120b are open.

On an upper surface of the main body device 110, an operation panel 130, with which various conditions related to image formation (such as paper size or the number of sheets) are inputted by the operator, and a copy glass 132, on which a document to be read is placed, are provided. The main body device 110 includes, at an upper portion thereof, an automatic document feeder 134 that conveys a document onto the copy glass 132. Moreover, the main body device 110 is equipped with an image scanner that scans the image of the document placed on the copy glass 132 and obtains image data representing the document image. The image data obtained by the image scanner is transmitted through a controller to an image formation unit. The image scanner and the controller are housed in a housing 150, which is a part of the main body device 110. The image formation unit is housed in the housing 150 as a process cartridge 142 that is freely attachable and detachable. The process cartridge 142 is attached and detached by rotating an operation lever 144.

A toner accommodation section 146 is attached to the housing 150 in the main body device 110, and toner is replenished from a toner supply port 148 to the toner accommodation section 146. The toner accommodated in the toner accommodation section 146 is supplied to a development device.

The main body device 110 includes, at a lower portion thereof, paper accommodation cassettes 140a, 140b, and 140c. In the main body device 110, feed rollers including a plural pairs of rollers are arranged, and a conveyance path is formed along which a sheet in the paper supply tray is conveyed to the image formation unit disposed above. Sheets housed in the paper supply tray are fed one by one by a paper supply mechanism disposed near an end of the conveyance path, and are fed into the conveyance path. A manual paper feed section 136 is further provided at a side face of the main body device 110, and sheets can also be fed from the manual paper feed section 136.

Sheets on which images have been formed by the image formation unit are sequentially conveyed through between two fixing rolls that contact with each other and that are supported by a housing 152, which is a part of the main body device 110. Then, the sheets are discharged to outside the main body device 110. The main body device 110 is equipped with plural paper discharge sections 138 that are disposed at a side opposite to the side at which the manual paper feed section 136 is attached, and sheets that have been subjected to image formation are discharged to the paper discharge sections.

For example, the resin composition of the present exemplary embodiment may be used for the front covers 120a and 120b, the exterior part of the process cartridge 142, the housings 150 and 152 in the image forming apparatus 100.

Hereinafter, various exemplary embodiments of the present invention will be described.

<1> A poly lactic acid resin including an L-lactic acid block and a D-lactic acid block, which blocks are bonded by a carbonate bonding.

<2> The poly lactic acid resin according to <1>, wherein an average composition ratio by weight of the L-lactic acid block to the D-lactic acid block is from about 15:85 to about 85:15, or from 15:85 to 85:15.

<3> The poly lactic acid resin according to <1>, wherein a crystallization rate of the poly lactic acid resin is from about 15 sec to about 60 sec, or from 15 sec to 60 sec.

<4> The poly lactic acid resin according to <1>, wherein each of the L-lactic acid block and the D-lactic acid block has a polymerization degree of about 10 or more, or 10 or more.

<5> A resin composition including a poly lactic acid resin that includes an L-lactic acid block and a D-lactic acid block, which blocks are bonded by a carbonate bonding.

<6> The resin composition according to <5>, wherein an average composition ratio by weight of the L-lactic acid block to the D-lactic acid block is from about 15:85 to about 85:15, or from 15:85 to 85:15.

<7> The resin composition according to <5>, wherein the resin composition further contains at least one resin selected from the group consisting of a poly lactic acid resin, a polycarbonate resin, a polypropylene resin, a polyester resin, and a polyamide resin.

<8> The resin composition according to <5>, wherein the resin composition further contains a compound having flame retardancy.

<9> The resin composition according to <5>, wherein a crystallization rate of the resin composition is from about 15 sec to about 60 sec, or from 15 sec to 60 sec.

<10> A resin molding that includes a poly lactic acid resin including an L-lactic acid block and a D-lactic acid block, which blocks are bonded by a carbonate bonding.

<11> The resin molding according to <10>, wherein an average composition ratio by weight of the L-lactic acid block to the D-lactic acid block is from about 15:85 to about 85:15, or from 5:85 to 85:15.

<12> The resin molding according to <10>, wherein the resin molding further contains at least one resin selected from the group consisting of a poly lactic acid resin, a polycarbonate resin, a polypropylene resin, a polyester resin, and a polyamide resin.

<13> The resin molding according to <10>, wherein the resin molding further contains a compound having flame retardancy.

<14> The resin molding according to <10>, wherein a crystallization rate of the resin molding is from about 15 sec to about 60 sec, or from 15 sec to 60 sec.

<15> The resin molding according to <10>, wherein a component of an electronic or electric instrument includes the resin molding.

According to an aspect of the invention in accordance with <1>, as compared with a case where an L-lactic acid block and a D-lactic acid block are not bonded by a carbonate bonding, there may be provided a poly lactic acid resin having a higher crystallization rate.

According to an aspect of the invention in accordance with <2>, as compared with a case which does not meet the aspect of the invention in accordance with <2>, there may be provided a poly lactic acid resin having a still higher crystallization rate.

According to an aspect of the invention in accordance with <3>, as compared with a case which does not meet the aspect of the invention in accordance with <3>, there may be provided a poly lactic acid resin having a still higher crystallization rate.

According to an aspect of the invention in accordance with <4>, as compared with a case which does not meet the aspect of the invention in accordance with <4>, there may be provided a poly lactic acid resin having a still higher crystallization rate.

According to an aspect of the invention in accordance with <5>, as compared with a case where a poly lactic acid resin including an L-lactic acid block and a D-lactic acid block, which blocks are bonded by a carbonate bonding is not included, there may be provided a resin composition having a higher crystallization rate.

According to an aspect of the invention in accordance with <6>, as compared with a case which does not meet the aspect of the invention in accordance with <6>, there may be provided a resin composition having a still higher crystallization rate.

According to an aspect of the invention in accordance with <7>, as compared with a case which does not meet the aspect of the invention in accordance with <7>, there may be provided a resin composition having a still higher crystallization rate.

According to an aspect of the invention in accordance with <8>, as compared with a case where a poly lactic acid resin including an L-lactic acid block and a D-lactic acid block, which blocks are bonded by a carbonate bonding is not included, there may be provided a resin composition having a crystallization rate that is prevented more effectively from being lowered even in the presence of a compound having flame retardancy.

According to an aspect of the invention in accordance with <9>, as compared with a case which does not meet the aspect of the invention in accordance with <9>, there may be provided a resin composition having a still higher crystallization rate.

According to an aspect of the invention in accordance with <10>, as compared with a case where a poly lactic acid resin including an L-lactic acid block and a D-lactic acid block, which blocks are bonded by a carbonate bonding is not included, there may be provided a resin molding having a higher deflection temperature under load.

According to an aspect of the invention in accordance with <11>, as compared with a case which does not meet the aspect of the invention in accordance with <11>, there may be provided a resin molding having a still higher crystallization rate.

According to an aspect of the invention in accordance with <12>, as compared with a case which does not meet the aspect of the invention in accordance with <12>, there may be provided a resin molding having a still higher crystallization rate.

According to an aspect of the invention in accordance with <13>, as compared with a case where a poly lactic acid resin including an L-lactic acid block and a D-lactic acid block, which blocks are bonded by a carbonate bonding is not included, there may be provided a resin molding having a crystallization rate that is prevented more effectively from being lowered even in the presence of a compound having flame retardancy.

According to an aspect of the invention in accordance with <14>, as compared with a case which does not meet the aspect of the invention in accordance with <14>, there may be provided a resin molding having a still higher crystallization rate.

According to an aspect of the invention in accordance with <15>, as compared with a case where a poly lactic acid resin including an L-lactic acid block and a D-lactic acid block, which blocks are bonded by a carbonate bonding is not included, there may be provided an electronic or electric instrument having a higher deflection temperature under load.

EXAMPLES

The present invention is described more specifically by referring to examples below. However, the present invention is not limited to these examples. Hereinafter, the term "part" is based on a weight standard, unless stated otherwise.

Examples A1 to A12

Synthesis of Poly Lactic Acid Resin

Poly L-lactic acid or poly D-lactic acid and diphenyl carbonate whose amounts are shown in the following Table 1 are charged in a 5 L three-necked flask; tetrabutoxy titanate serving as an ester-exchange catalyst is added in an amount shown in the following Table 1; while the flask is subjected to vacuum suction and the chemicals in the flask are agitated, the temperature thereof is elevated from room temperature (20° C.) to 200° C. at a rate of 30° C./hour, and phenol that is distilled out is trapped; the temperature is kept constant at 200° C. over 4 hours, and the amount of the phenol distilled out is measured. After that, the chemicals in the flask are dissolved in tetrahydrofuran and re-precipitated in methanol; precipitates that are obtained after filtration are recovered as compounds 1 to 12.

Identification of Poly Lactic Acid Resin

The resulting compounds are identified with FTIR ("FTIR6300" (trade name) manufactured by TASCO Corp.). As an example of absorption spectra, an absorption spectrum of a compound obtained in Example A1 is shown in FIG. 2. A magnification of a part of the spectrum shown in FIG. 2 is depicted in FIG. 3.

As shown in FIG. 3, with respect to a peak that is derived from a carbonyl group and appears at around 1750 $cm^{-1}$, there is a slightly shift in the peak between an L-unit and a D-unit. The average composition ratio (weight ratio) of L-form: D-form was determined by the difference in peak intensity between these units.

Further, the carbonate bonding is identified by means of $^{13}$C-NMR (400 MHz, $CDCL_3$) (JNM-AL400, manufactured by JEOL Ltd.). As a result, existence of the carbonate bonding is confirmed by observation of a peak that is derived from a carbonyl group and appears at around 154 ppm.

Measurement of Weight Average Molecular Weight

The weight average molecular weight of the resulting compound is measured using a gel permeation chromatograph ("HLC-8320GPC" (trade name) manufactured by TOSOH Corp.). The results are shown in Table 1.

Evaluation Tests

Evaluation of Crystallization Rate

The resulting compound is pulverized and fused at 200° C. with a differential scanning calorimeter (DSC-8500 (trade name) manufactured by PerkinElmer Inc.); then, rapidly cooled and held at 110° C. so as to measure a saturation time of a crystallization peak. Crystallization rate is evaluated in terms of the saturation time. The results are shown in Table 3.

Evaluation of Deflection Temperature Under Load

The resulting compound is injection-molded with an injection-molding machine (NEX150 (trade name) manufactured by Nissei Plastic Industrial Co., Ltd.) at a cylinder temperature of 180° C. and a mold temperature of 80° C., thereby obtaining a ISO Multi-purpose test specimen (10 mm width and 4 mm thickness). The deflection temperature under load (ISO75) of the test specimen is measured at a load of 1.8 MPa with a, HDT measurement apparatus (HDT-3 (trade name) manufactured by Toyo Seiki Seisaku-sho, LTD.). The results are shown in Table 3.

Comparative Examples A1 and A2

Compounds shown in the following Table 2 are put in a bi-axial kneader (TEM58SS (trade name) manufactured by Toshiba Machine Co., Ltd.) and kneaded at temperatures shown in the following Table 2, thereby obtaining pellets of Comparative Examples 1 and 2.

Test specimens of the resulting pellets are molded respectively in accordance with the method described in Example 1 and were subjected to the evaluation tests. The results are shown in Table 3.

Comparative Examples 3 and 4

Compounds shown in the following Table 2 are put in a bi-axial kneader (TEM58SS (trade name) manufactured by Toshiba Machine Co., Ltd.) and kneaded at temperatures shown in the following Table 2, thereby obtaining comparative compounds 3 and 4.

Test specimens of the comparative compounds 3 and 4 are molded respectively in accordance with the method described in Example 1 and are subjected to the evaluation tests. The results are shown in Table 3.

TABLE 1

| | | | Compositions (g) | | | | | | | | Reaction | Compound properties | |
| | | | Poly L-lactic acid | | | | Poly D-lactic acid | | | | Amount of phenol | Weight | L-form: D-form |
| | | Compounds | *MW 10000 | *MW 40000 | *MW 60000 | *MW 120000 | *MW 30000 | *MW 80000 | Diphenyl carbonate | Tetrabutoxy titanate | distilled out | average *MW | ratio by weight |
|---|---|---|---|---|---|---|---|---|---|---|---|---|---|
| Examples | A1 | Compound 1 | 2000 | — | — | — | — | — | 40 | 1.2 | 33.8 | 22000 | 54/46 |
| | A2 | Compound 2 | 1000 | 1000 | — | — | — | — | 38 | 1 | 29.9 | 53000 | 56/44 |
| | A3 | Compound 3 | 1000 | — | 1000 | — | — | — | 36 | 0.9 | 28.5 | 79000 | 58/42 |
| | A4 | Compound 4 | 1000 | — | — | 1000 | — | — | 32 | 0.7 | 25.6 | 142000 | 58/42 |
| | A5 | Compound 5 | — | 2000 | — | — | — | — | 36 | 1 | 29.2 | 85000 | 51/49 |
| | A6 | Compound 6 | — | — | 2000 | — | — | — | 31 | 0.8 | 38.5 | 136000 | 53/47 |
| | A7 | Compound 7 | — | — | — | 2000 | — | — | 25 | 0.6 | 21.8 | 262000 | 52/48 |
| | A8 | Compound 8 | 500 | 500 | — | 1000 | — | — | 18 | 2.5 | 18.5 | 450000 | 80/20 |
| | A9 | Compound 9 | 1000 | — | 500 | 500 | — | — | 40 | 0.9 | 15.5 | 435000 | 19/81 |
| | A10 | Compound 10 | — | — | — | — | 2000 | — | 40 | 1.6 | 31.5 | 58000 | 55/45 |
| | A11 | Compound 11 | — | — | — | — | — | 2000 | 40 | 1.5 | 24.8 | 148000 | 52/48 |
| | A12 | Compound 12 | — | — | — | — | 1000 | 1000 | 40 | 1.6 | 28.2 | 125000 | 65/35 |

*MW: molecular weight

TABLE 2

| | | | Compositions (parts) | | Compound properties | | |
| | | | Poly L-lactic acid *MW 60000 | Poly D-lactic acid *MW 30000 | Weight average *MW | L-form: D-form ratio by weight | Kneading temperature (° C.) |
| | | Comparative compounds | | | | | |
|---|---|---|---|---|---|---|---|
| Comparative Examples | A1 | Comparative compound 1 | 100 | — | 60000 | 100/0 | 180 |
| | A2 | Comparative compound 2 | — | 100 | 30000 | 0/100 | 180 |
| | A3 | Comparative compound 3 | 50 | 50 | 44000 | 50/50 | 180 |
| | A4 | Comparative compound 4 | 70 | 30 | 50000 | 70/30 | 180 |

*MW: molecular weight

Component chemicals described in the above Table 1 and Table 2 are the followings, respectively:

Poly L-lactic acid (molecular weight: 10000): synthesized one was used, not a commercially available one.
Poly L-lactic acid (molecular weight: 40000): synthesized one was used, not a commercially available one.
Poly L-lactic acid (molecular weight: 60000): LACEA H100 (trade name) manufactured by Mitsui Chemicals, Inc.
Poly L-lactic acid (molecular weight: 120000): "TERRA-MAC TE2000" (trade name) manufactured by UNI-TIKA LTD.
Poly D-lactic acid (molecular weight: 30000): D-PLA#30000 (trade name) manufactured by Musashino Chemical Laboratory, Ltd.
Poly D-lactic acid (molecular weight: 80000): D-PLA#80000 (trade name) manufactured by Musashino Chemical Laboratory, Ltd.
Diphenyl carbonate: DIPHENYL CARBONATE (trade name) manufactured by Aldrich Corp.
Tetrabutoxy titanate: TETRABUTOXY TITANATE (trade name) manufactured by Wako Pure Chemical Industries, Ltd.

TABLE 3

|  |  | Compounds | Crystallization rate (sec) | Deflection temperature under load (° C.) |
|---|---|---|---|---|
| Examples | A1 | Compound 1 | 25 | 82 |
|  | A2 | Compound 2 | 32 | 79 |
|  | A3 | Compound 3 | 20 | 85 |
|  | A4 | Compound 4 | 25 | 82 |
|  | A5 | Compound 5 | 24 | 83 |
|  | A6 | Compound 6 | 31 | 78 |
|  | A7 | Compound 7 | 35 | 85 |
|  | A8 | Compound 8 | 42 | 91 |
|  | A9 | Compound 9 | 43 | 90 |
|  | A10 | Compound 10 | 40 | 90 |
|  | A11 | Compound 11 | 48 | 92 |
|  | A12 | Compound 12 | 52 | 88 |
| Comparative Examples | A1 | Comparative compound 1 | 1500 | 58 |
|  | A2 | Comparative compound 2 | 2350 | 54 |
|  | A3 | Comparative compound 3 | 620 | 56 |
|  | A4 | Comparative compound 4 | 580 | 57 |

Examples B1 to B20

Comparative Examples H1 to B7

Compounds having compositions shown in the following Tables 4 to 6 are put in a bi-axial kneader (TEM58SS (trade name) manufactured by Toshiba Machine Co., Ltd.) and kneaded at temperatures shown in Tables 4 to 6, thereby obtaining pellets.

The resulting pellets are molded into test specimens respectively in accordance with the method described in Example 1 and are subjected to evaluations of crystallization rate and deflection temperature under load.

In addition to that, the resulting pellets are molded into UL94 test specimens (1.6 mm thickness) respectively and are subjected to the UL94-V test so as to evaluate flame retardancy. Here, the flame retardancy is ranked in order of V0, V1, and V2, in which V0 is highest and V2 is lowest. When the flame retardancy is lower than V2, that is, when fire extended over a test specimen, the test specimen is ranked as V-not. The results are shown in Table 7.

TABLE 4

|  |  | Compound 1 | Compound 4 | Compound 8 | Compound 9 | Poly lactic acid | Poly-carbonate | Poly-propylene | Poly-ester | Poly-amide | Kneading temperature (° C.) |
|---|---|---|---|---|---|---|---|---|---|---|---|
| Examples | B1 | 100 | — | — | — | 50 | — | — | — | — | 180 |
|  | B2 | 100 | — | — | — | — | 50 | — | — | — | 230 |
|  | B3 | 100 | — | — | — | — | — | 50 | — | — | 180 |
|  | B4 | 100 | — | — | — | — | — | — | 50 | — | 200 |
|  | B5 | 100 | — | — | — | — | — | — | — | 50 | 220 |
|  | B6 | 100 | — | — | — | — | 15 | — | — | — | 200 |
|  | B7 | 100 | — | — | — | — | 100 | — | — | — | 240 |
|  | B8 | 15 | — | — | — | — | 100 | — | — | — | 260 |

TABLE 5

|  |  | *Cpd. 1 | *Cpd. 4 | *Cpd. 8 | *Cpd. 9 | Poly lactic acid | Poly-carbonate | Condensed phosphoric acid ester | Poly (ammonium phosphate) | Melamine sulfate | Silicone powder | Magnesium hydroxide | Kneading temperature (° C.) |
|---|---|---|---|---|---|---|---|---|---|---|---|---|---|
| Examples | B9 | 100 | — | — | — | 50 | — | 20 | — | — | — | — | 170 |
|  | B10 | 100 | — | — | — | — | 50 | 20 | — | — | — | — | 210 |
|  | B11 | 100 | — | — | — | — | 50 | — | 20 | — | — | — | 220 |
|  | B12 | 100 | — | — | — | — | 50 | — | — | 20 | — | — | 220 |
|  | B13 | 100 | — | — | — | — | 50 | — | — | — | 20 | — | 230 |
|  | B14 | 100 | — | — | — | — | 50 | — | — | — | — | 20 | 250 |

TABLE 5-continued

|     | *Cpd. 1 | *Cpd. 4 | *Cpd. 8 | *Cpd. 9 | Poly lactic acid | Poly-carbonate | Condensed phosphoric acid ester | Poly (ammonium phosphate) | Melamine sulfate | Silicone powder | Magnesium hydroxide | Kneading temperature (° C.) |
|---|---|---|---|---|---|---|---|---|---|---|---|---|
| B15 | 100 | — | — | — | — | 50 | 10 | — | — | — | — | 220 |
| B16 | 100 | — | — | — | — | 50 | 50 | — | — | — | — | 190 |
| B17 | — | 100 | — | — | — | 50 | 20 | — | — | — | — | 220 |
| B18 | — | — | 100 | — | — | 50 | 20 | — | — | — | — | 210 |
| B19 | — | — | — | 100 | — | 50 | 20 | — | — | — | — | 220 |
| B20 | — | 100 | — | — | — | 50 | — | — | — | — | — | 220 |

*Cpd.: Compound

TABLE 6

|  |  | Comparative compound 1 | Comparative compound 2 | Comparative compound 3 | Comparative compound 4 | Other resins Poly-carbonate | Flame retardant Condensed phosphoric acid ester | Kneading temperature (° C.) |
|---|---|---|---|---|---|---|---|---|
| Comparative Examples | B1 | 100 | — | — | — | 50 | — | 240 |
|  | B2 | — | 100 | — | — | 50 | — | 240 |
|  | B3 | — | — | 100 | — | 50 | — | 230 |
|  | B4 | — | — | — | 100 | 50 | — | 240 |
|  | B5 | 100 | — | — | — | 50 | 10 | 230 |
|  | B6 | 100 | — | — | — | 50 | 20 | 230 |
|  | B7 | 100 | — | — | — | 50 | 50 | 220 |

Component chemicals described in the above Tables 4 to 6 are the followings, respectively.

Other Resins:
Poly lactic acid: TERRAMAC TE2000 (trade name) manufactured by UNITIKA LTD.
Polycarbonate: PANLITE L1225Y (trade name) manufactured by TEIJIN CHEMICALS LTD.
Polypropylene: "NOVATEC BC3L" (trade name) manufactured by Japan Polypropylene Corporation.
Polyester: "VYLON 103" (trade name) manufactured by TOYOBO CO., LTD.
Polyamide: "BMNO" (trade name) manufactured by Arkema Corporation.

Flame Retardants:
Condensed phosphoric acid ester: PX200 (trade name) manufactured by Daihachi Chemical Industry Co., Ltd.
Poly(ammonium phosphate): EXOLITZ AP422 (trade name) manufactured by Clariant Corpation.
Melamine sulfate: "APINON-901" (trade name) manufactured by Sanwa Chemical Co., Ltd.
Silicone powder: Z6018 (trade name) manufactured by Dow Corning Toray Silicone Co., Ltd.
Magnesium hydroxide: ECOMAG PZ-1 (trade name) manufactured by Tateho Chemical Industries Co., Ltd.

TABLE 7

|  |  | Evaluations | | |
|---|---|---|---|---|
|  |  | Crystallization rate (sec) | Deflection temperature under load (° C.) | Flame retardancy (1.6 mm) |
| Examples | B1 | 27 | 75 | V-not |
|  | B2 | 35 | 92 | V2 |
|  | B3 | 36 | 75 | V-not |
|  | B4 | 32 | 73 | V-not |
|  | B5 | 32 | 70 | V-not |
|  | B6 | 26 | 84 | V-not |
|  | B7 | 35 | 98 | V2 |
|  | B8 | 48 | 125 | V2 |
|  | B9 | 38 | 72 | V0 |
|  | B10 | 49 | 84 | V0 |
|  | B11 | 45 | 85 | V0 |
|  | B12 | 46 | 80 | V0 |
|  | B13 | 39 | 89 | V0 |
|  | B14 | 29 | 89 | V0 |
|  | B15 | 35 | 73 | V1 |
|  | B16 | 49 | 66 | V0 |
|  | B17 | 39 | 74 | V0 |
|  | B18 | 40 | 77 | V0 |
|  | B19 | 41 | 75 | V1 |
|  | B20 | 42 | 74 | V1 |
| Comparative Examples | B1 | 3600 | 64 | V-not |
|  | B2 | 6250 | 63 | V-not |
|  | B3 | 1210 | 67 | V-not |
|  | B4 | 1200 | 67 | V-not |
|  | B5 | 5200 | 65 | V-not |
|  | B6 | 6800 | 61 | V2 |
|  | B7 | 12500 | 53 | V2 |

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin composition comprising a poly lactic acid resin comprising
an L-lactic acid block and a D-lactic acid block, which blocks are bonded by carbonate bonding; and
a compound having flame retardancy kneaded with the L-lactic acid block and the D-lactic acid block, which blocks are bonded by carbonate bonding, wherein
the compound having flame retardancy is a compound that exhibits no flame retardancy by itself, but exhibits flame a retardancy of HB or higher as defined by UL-94 when the compound is added to a resin composition that has a flame retardancy of lower than HB as defined by UL-94.

2. The resin composition according to claim 1, wherein an average composition ratio by weight of the L-lactic acid block to the D-lactic acid block is from about 15:85 to about 85:15.

3. The resin composition according to claim 1, wherein the resin composition further contains at least one resin selected from the group consisting of a poly lactic acid resin, a polycarbonate resin, a polypropylene resin, a polyester resin, and a polyamide resin.

4. The resin composition according to claim 1, wherein a crystallization rate of the resin composition is from about 15 sec to about 60 sec.

5. A resin molding comprising
a poly lactic acid resin comprising an L-lactic acid block and a D-lactic acid block, which blocks are bonded by carbonate bonding; and
a compound having flame retardancy kneaded with the L-lactic acid block and the D-lactic acid block, which blocks are bonded by carbonate bonding, wherein
the compound having flame retardancy is a compound that exhibits no flame retardancy by itself, but exhibits flame a retardancy of HB or higher as defined by UL-94 when the compound is added to a resin composition that has a flame retardancy of lower than HB as defined by UL-94.

6. The resin molding according to claim 5, wherein an average composition ratio by weight of the L-lactic acid block to the D-lactic acid block is from about 15:85 to about 85:15.

7. The resin molding according to claim 5, wherein the resin molding further contains at least one resin selected from the group consisting of a poly lactic acid resin, a polycarbonate resin, a polypropylene resin, a polyester resin, and a polyamide resin.

8. The resin molding according to claim 5, wherein a crystallization rate of the resin molding is from about 15 sec to about 60 sec.

9. The resin molding according to claim 5, wherein a component of an electronic or electric instrument comprises the resin molding.

10. The resin composition according to claim 1, wherein the compound having flame retardancy is a member selected from the group consisting of a phosphorus-based flame retardant, a silicone-based flame retardant, a nitrogen-containing flame retardant, a sulfuric acid-based flame retardant, and an inorganic hydroxide-based flame retardant.

11. The resin composition according to claim 1, wherein the compound having flame retardancy is a member selected from the group consisting of melamine phosphate, ammonium phosphate, aluminum phosphate, dimethyl siloxane, nano silica, silicone-modified polycarbonate, a melamine compound, a triazine compound, melamine sulfate, guanidine sulfate, magnesium hydroxide, and aluminum hydroxide.

12. The resin molding according to claim 5, wherein the compound having flame retardancy is a member selected from the group consisting of a phosphorus-based flame retardant, a silicone-based flame retardant, a nitrogen-containing flame retardant, a sulfuric acid-based flame retardant, and an inorganic hydroxide-based flame retardant.

13. The resin molding according to claim 5, wherein the compound having flame retardancy is a member selected from the group consisting of melamine phosphate, ammonium phosphate, aluminum phosphate, dimethyl siloxane, nano silica, silicone-modified polycarbonate, a melamine compound, a triazine compound, melamine sulfate, guanidine sulfate, magnesium hydroxide, and aluminum hydroxide.

* * * * *